(12) United States Patent
Negron

(10) Patent No.: US 11,751,546 B2
(45) Date of Patent: Sep. 12, 2023

(54) MULTI-DIRECTIONAL MODULAR AQUARIUM LED LIGHTING BULBS AND SYSTEM

(71) Applicant: Ariel Negron, Tamarac, FL (US)

(72) Inventor: Ariel Negron, Tamarac, FL (US)

( * ) Notice: Subject to any disclaimer, the term of this patent is extended or adjusted under 35 U.S.C. 154(b) by 40 days.

(21) Appl. No.: 17/502,071

(22) Filed: Oct. 15, 2021

(65) Prior Publication Data
US 2022/0338451 A1    Oct. 27, 2022

Related U.S. Application Data

(60) Provisional application No. 63/177,531, filed on Apr. 21, 2021.

(51) Int. Cl.
| | |
|---|---|
| *A01K 63/06* | (2006.01) |
| *F21V 33/00* | (2006.01) |
| *F21V 23/00* | (2015.01) |
| *A01K 63/00* | (2017.01) |
| *F21V 29/74* | (2015.01) |
| *F21Y 115/10* | (2016.01) |
| *F21W 131/308* | (2006.01) |

(52) U.S. Cl.
CPC ............ *A01K 63/06* (2013.01); *A01K 63/006* (2013.01); *F21V 23/003* (2013.01); *F21V 29/74* (2015.01); *F21V 33/0004* (2013.01); *F21W 2131/308* (2013.01); *F21Y 2115/10* (2016.08)

(58) Field of Classification Search
CPC ................................ A01K 63/06; F21V 29/74
See application file for complete search history.

(56) References Cited

U.S. PATENT DOCUMENTS

| | | | |
|---|---|---|---|
| 8,919,992 B2 * | 12/2014 | Dellian | F21K 9/90 362/225 |
| 2006/0261365 A1 * | 11/2006 | Hsu | H01L 25/0753 257/E25.02 |
| 2018/0027779 A1 * | 2/2018 | Vissenberg | F21V 7/0083 |
| 2020/0267949 A1 * | 8/2020 | Bagnall | H05B 45/10 |
| 2020/0337274 A1 * | 10/2020 | Howe | A01K 63/06 |
| 2021/0341134 A1 * | 11/2021 | May | F21S 2/00 |
| 2022/0132814 A1 * | 5/2022 | Flora | F21V 9/08 362/101 |

* cited by examiner

*Primary Examiner* — Christopher E Dunay

(57) ABSTRACT

The present invention discloses an enhanced design of a multi-directional Modular Aquarium LED lighting bulbs and system where the led lights are mounted on a 3 sided heatsink forming an isosceles trapezoid. Further a system is provided where each bulb, light bulb spectrum user desires to use in either specific spectrum in nanometer ranges (ie: UV, Indigo, Violet, Royal Blue, Blue, Cyan, etc) utilizing specific kelvin spectrum (ie: 2000 k, 3000 k, 6000 k, 10,000 k, etc) can be controlled by an application. The system further updates the available colors within the mobile app and website, in order to allow the user to control the intensity as well as schedule sunset/sunrise features along the day.

14 Claims, 2 Drawing Sheets

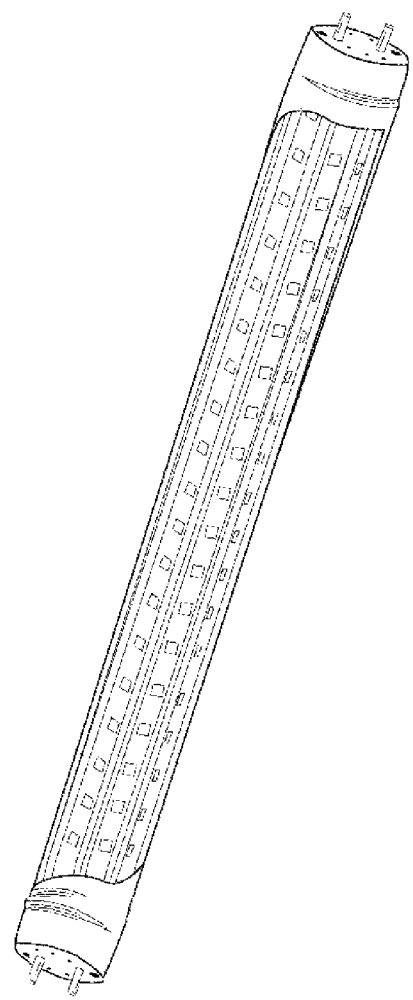
Fig: 1

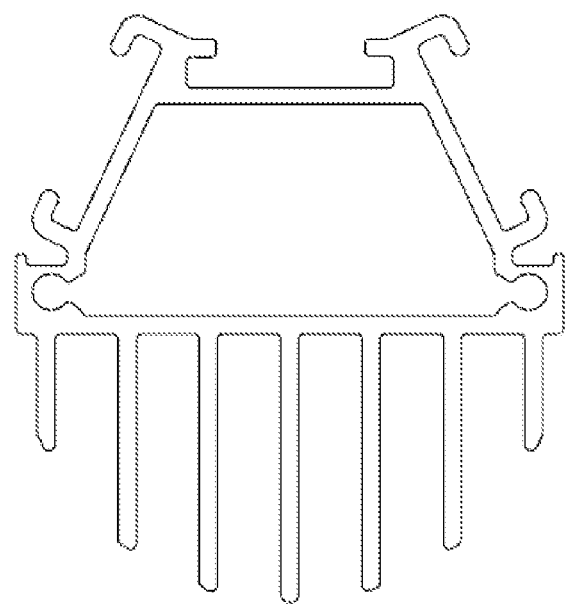
Fig: 2

MULTI-DIRECTIONAL MODULAR AQUARIUM LED LIGHTING BULBS AND SYSTEM

COPYRIGHT NOTICE

A portion of the disclosure of this patent document contains material which is subject to copyright protection. The copyright owner has no objection to the facsimile reproduction by anyone of the patent disclosure, as it appears in the Patent and Trademark Office patent files or records, but otherwise reserves all copyright rights whatsoever.

BACKGROUND

Field of the Invention

The present disclosure relates to lighting systems and in particular to modular led system, multi-sided linear T8 led bulbs used for aquariums, high PAR linear led aquarium bulb.

Description of the Related Art

Special lighting is frequently provided for aquarium and horticulture applications. When in use, this lighting may be situated above the aquarium or horticulture system. The lighting may be incorporated within a housing or hood. Heretofore the words "housing" or "hood" will both be referred to as "housing". The lighting and housing will together be referred to as the lighting system.

Sometimes, the lighting system will be designed to enhance the functionality and/or appearance of the items illuminated. For example, aquarium lighting may be designed with brightness and color content to enhance the appearance of the water and contents. The brightness and light source selected may be such that fish and plants receive enough light of a spectrum to encourage life and growth.

Lighting systems should be designed in a flexible fashion to deliver light quality suitable for the application. Salt water aquarium lighting systems in particular should maintain proper spectral output and intensity for maintaining the health of coral and fish. Salt water aquarium lighting systems should not produce excessive ultraviolet radiation and/or heat that can harm aquatic life.

Typical aquarium lights utilize either fluorescent bulbs, halogen incandescent bulbs, or metal halide (MH) incandescent bulbs. The primary purpose of most aquarium lights is to provide an attractive illumination of the aquarium tank and its contents, for viewing. In addition, aquarium lights also support the growth of marine life, including marine plants, coral, and potentially algae. The objectives and preferred characteristics of light sources for achieving these two broad purposes can be substantially different, and the different types of light sources used in existing aquarium lights have differing advantages and disadvantages in meeting these objectives.

The preferred characteristics of a light source intended for providing an attractive source of illumination for viewing an aquarium, include a spectral content that is reasonably close to that of natural sunlight, including having a high color rendering index (CRI). The desired spectral content is often intended to reflect the blue shift (or reduction of longer-wavelength red light) that occurs as sunlight passes through water. This results in a natural appearance for fish and other marine life in the aquarium. Some aquarium owners and tropical fish enthusiasts also place value on a light source or lighting system in which the nature of the light can be varied over time, to mimic the differences in sunlight at different times of day, and also to provide light that mimics natural moonlight during the evening.

Another key attribute for aquarium viewing is the spatial distribution of the light from the light source. Light that appears to emanate from a point source, or an approximation of a point source, creates a more natural "shimmering" effect within the aquarium, when the surface of the water is rippled. This effect is created when light emanating from a point source casts shadows of the ripples. This shimmering effect can be observed on the floor or bottom surface of the aquarium, and on the objects within the aquarium. In contrast, a light source that is broadly distributed over the top of the aquarium will result in a blurring of the shimmering effect, with far less contrast. This is similar to the observation that natural sunlight (which emanates from a near point source) creates very sharp and distinct shadows, whereas a distributed light source creates either multiple shadows, or highly-blurred and indistinct shadows. This is because sunlight illuminates an area from only one direction to create distinct shadows, whereas light from a broadly distributed light source will illuminate the area from different directions, thereby causing a blurring of the shadows, or even obliterating the shadows altogether. Existing aquarium light sources that approximate a point source of light, such as a single incandescent bulb, therefore provide an attractive shimmering effect, whereas more distributed light sources, such as a long fluorescent tube, do not provide an attractive shimmering effect.

The preferred characteristics of a light source intended for growing marine life such as marine plants, algae, and coral, are somewhat different from the characteristics that are desired for aquarium viewing. Different types of marine life will prefer different specific wavelengths of light, both in terms of encouraging growth, and also in terms of encouraging specific behaviors and effects. It may also be beneficial to be able to vary the spectral content of the light source over time, either to mimic the day-night cycle, or possibly to mimic longer-term cycles such as the lunar month, as well as seasonal variations that occur in nature. In terms of the light source's spatial distribution, the preferred characteristics include high intensity, as well as uniformity of both the spectral content and intensity over a reasonably large area.

It is also desirable for an aquarium light to have a compact form factor, so that the light does not cover a high percentage of the top of the aquarium tank. An aquarium light with a compact form factor will provide less-obstructed viewing of the aquarium from above, and will also make activities such as feeding, tank cleaning, and other aquarium maintenance tasks, less difficult. Other desirable attributes for a preferred aquarium light include low cost, low electrical power consumption, low or reduced heat generation, high reliability, and long life.

There are multiple solutions that have been presented in prior art. However, these solutions are limited and restricted to their conventional architecture, installation system and have considerable shortcomings which adversely affect the convenience with which they can be used. The prior systems have certain limitations including the design of assemblies which make them not suitable for every type of user. Moreover, the ease-of-use ability of these assemblies is also questionable.

It has to be noted that the current invention proposes an assembly with multiple advancements including a structure utilizing T8 bulb format with specific led spectrum geared towards saltwater and freshwater aquarium, while providing light spread from 3 different angles per light bulb, in order to provide even multi-directional spread of light.

None of the previous inventions and patents, taken either singly or in combination, is seen to describe the instant invention as claimed. Hence, the inventor of the present invention proposes to resolve and surmount existent technical difficulties to eliminate the aforementioned shortcomings of prior art.

SUMMARY

In light of the disadvantages of the prior art, the following summary is provided to facilitate an understanding of some of the innovative features unique to the present invention and is not intended to be a full description. A full appreciation of the various aspects of the invention can be gained by taking the entire specification, claims, drawings, and abstract as a whole.

The primary desirable object of the present invention is to provide a novel and improved form of an a multi directional modular aquarium LED lighting bulbs and systems.

It is more particularly objective of invention to utilize T8 bulb format with specific led spectrum geared towards saltwater and freshwater aquarium, while providing light spread from 3 different angles per light bulb, in order to provide even multi-directional spread of light.

It is further the objective of the invention to provide led lights which are mounted on a 3 sided heatsink forming an isosceles trapezoid. This shape provides the best light spread of each individual spectrum.

It is also the objective of the invention to provide a device which is multi-sided linear T8 led bulbs used for aquariums, high PAR linear led aquarium bulb A further object is to provide an assembly that is simple, rapidly adjusted and easy to use.

A still further object is to provide an assembly that is economical in cost to manufacture.

Other aspects, advantages and novel features of the present invention will become apparent from the detailed description of the invention when considered in conjunction with the accompanying drawings.

This Summary is provided merely for purposes of summarizing some example embodiments, so as to provide a basic understanding of some aspects of the subject matter described herein. Accordingly, it will be appreciated that the above-described features are merely examples and should not be construed to narrow the scope or spirit of the subject matter described herein in any way. Other features, aspects, and advantages of the subject matter described herein will become apparent from the following Detailed Description, Figures, and Claims.

BRIEF DESCRIPTION OF THE DRAWINGS

The accompanying figures, where like reference numerals refer to identical or functionally similar elements throughout the separate views, together with the detailed description below, are incorporated in and form part of the specification, and serve to further illustrate embodiments of concepts that include the claimed invention, and explain various principles and advantages of those embodiments.

FIG. 1 shows top view as per preferred embodiments of the invention.

FIG. 2 shows heatsink which is designed to assist with LED heat dissipation when applying airflow onto the increased surface area housing. The fins help distribute heat produced by LED evenly across the entire housing structure, effectively cooling and protecting the LED diodes from damage caused by excessive heat.

The apparatus and method components have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

The apparatus and method components have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

DETAILED DESCRIPTION

Detailed descriptions of the preferred embodiment are provided herein. It is to be understood, however, that the present invention may be embodied in various forms. Therefore, specific details disclosed herein are not to be interpreted as limiting, but rather as a basis for the claims and as a representative basis for teaching one skilled in the art to employ the present invention in virtually any appropriately detailed system, structure or manner.

The terminology used herein is for the purpose of describing particular embodiments only and is not intended to be limiting of the invention. As used herein, the term "and/or" includes any and all combinations of one or more of the associated listed items. As used herein, the singular forms "a," "an," and "the" are intended to include the plural forms as well as the singular forms, unless the context clearly indicates otherwise. It will be further understood that the terms "comprises" and/or "comprising," when used in this specification, specify the presence of stated features, steps, operations, elements, and/or components, but do not preclude the presence or addition of one or more other features, steps, operations, elements, components, and/or groups thereof.

The present invention is directed to a multi-directional Modular Aquarium LED lighting bulbs and system.

Existing aquarium lights and aquarium light source technologies have different advantages and disadvantages, for the dual purposes of providing an attractive source of illumination for aquarium viewing, and encouraging the growth of marine life. Fluorescent bulbs, as well as incandescent bulbs, such as halogen and metal halide light sources, provide a fairly broad spectrum of light, and can provide good or at least acceptable color rendering. However, their spectral content is fixed. Thus, varying the spectral content over time is not possible, unless multiple bulb types are incorporated into the light. It is also not possible to tailor the spectral content to emphasize the specific wavelengths that might be optimal for the growth of marine life. It is also true that incandescent bulbs in particular (and fluorescent bulbs to a lesser extent) may produce significant quantities of radiated infrared energy, which serves to heat the water in the aquarium. This may require a cooling apparatus for the water in the aquarium tank, which in turn adds to the energy, costs of the aquarium.

The current invention as per its preferred embodiments utilizes T8 bulb format with specific led spectrum geared towards saltwater and freshwater aquarium, while providing light spread from 3 different angles per light bulb, in order to provide even multi-directional spread of light.

The LED lights are mounted on a 3 sided heatsink (left side facing approximately 150 degrees, center facing 90 degrees, and right side facing 30 degrees) forming an isosceles trapezoid.

This shape as per its preferred embodiments has been utilized to provide the best light spread of each individual spectrum. Each light bulb will be independently identified and controlled by the system either via mobile application or website.

The light bulb will evenly illuminate an aquarium while also providing modularity for the user in terms of which light bulb spectrum they desire to use in either specific spectrum in nanometer ranges (ie: UV, Indigo, Violet, Royal Blue, Blue, Cyan, etc) or utilizing specific kelvin spectrum (ie: 2000 k, 3000 k, 6000 k, 10,000 k, etc).

By providing different spectrum bulbs as per its preferred embodiments a user will have the ability to maintain thriving aquarium animals and provide sunrise/sunset features, as well as moonlight features with desired bulb color.

The working of light bulbs can be explained as they work by having the system identify the bulb which has been pre-programming with the spectrum of the bulb. Once the system has identified the bulb(s), it updates the available colors within the mobile app and website, in order to allow the user to control the intensity as well as schedule sunset/sunrise features along the day.

The shape, sides, number of LED's, and LED power as per its further embodiments has been tested and identified for its ability to resolve problems with current LED aquarium light fixtures in the industry, such as light spread, light blend, modularity, intensity, and the ability to repair the system without replacing the entire or majority of the existing system.

While a specific embodiment has been shown and described, many variations are possible. With time, additional features may be employed. The particular shape or configuration of the platform or the interior configuration may be changed to suit the system or equipment with which it is used.

Having described the invention in detail, those skilled in the art will appreciate that modifications may be made to the invention without departing from its spirit. Therefore, it is not intended that the scope of the invention be limited to the specific embodiment illustrated and described. Rather, it is intended that the scope of this invention be determined by the appended claims and their equivalents.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus, the following claims are hereby incorporated into the Detailed Description, with each claim standing on its own as a separately claimed subject matter.

The invention claimed is:

1. A multi-directional smart aquarium LED light bulb and system, comprising:
   a base configured to provide power;
   an elongated heat sink, wherein the elongated heat sink is provided with at least three light source disposition surfaces;
   a plurality LED light sources disposed along the at least three light source disposition surfaces;
   wherein the distance between each of the LED light sources of the plurality of LED lights sources disposed along each of the light source disposition surfaces is adjustable to achieve a targeted shimmering effect.

2. The multi-directional smart aquarium LED light bulb and system of claim 1, further comprising:
   a controller, wherein the controller is configured to adjust an output characteristic of each LED light source of the plurality of LED light sources.

3. The multi-directional smart aquarium LED light bulb and system of claim 2, wherein the output characteristic of each LED light source of the plurality of LED light sources is at least one of spectrum and intensity.

4. The multi-directional smart aquarium LED light bulb and system of claim 2, wherein the controller comprises an antenna, wherein the output characteristic is configurable by a remote computer application.

5. The multi-directional smart aquarium LED light bulb and system of claim 3, wherein the remote computer application is at least one of a smartphone application or website.

6. The multi-directional smart aquarium LED light bulb and system of claim 2, wherein the output characteristic is automatically adjustable based on at least one of time of day, lunar cycle, and season.

7. The multi-directional smart aquarium LED light bulb and system of claim 1, wherein the aquarium is at least one of a saltwater aquarium and a freshwater aquarium.

8. The multi-directional smart aquarium LED light bulb and system of claim 1, wherein the base comprises a T8 bulb format.

9. The multi-directional smart aquarium LED light bulb and system of claim 1, wherein the at least three light source disposition surfaces angled relative to each other having a center surface facing approximately 90 degrees, a right surface facing approximately 30 degrees, and a left surface facing approximately 150 degrees.

10. A multi-directional smart aquarium LED light bulb and system for a saltwater or freshwater aquarium, comprising:
    a T8 base configured to provide power;
    an elongated heat sink, wherein the elongated heat sink is provided with at least three light source disposition surfaces;
    a plurality LED light sources disposed along the at least three light source disposition surfaces;
    a controller, wherein the controller is configured to adjust an output characteristic of each LED light source of the plurality of LED light sources;
    wherein the at least three light source disposition surfaces angled relative to each other having a center surface facing approximately 90 degrees, a right surface facing approximately 30 degrees, and a left surface facing approximately 150 degrees
    wherein the distance between each of the LED light sources of the plurality of LED lights sources disposed along each of the light source disposition surfaces is adjustable to achieve a targeted shimmering effect.

11. The multi-directional smart aquarium LED light bulb and system of claim 10, wherein the output characteristic of each LED light source of the plurality of LED light sources is at least one of spectrum and intensity.

12. The multi-directional smart aquarium LED light bulb and system of claim 10, wherein the controller comprises an antenna, wherein the output characteristic is configurable by a remote computer application.

13. The multi-directional smart aquarium LED light bulb and system of claim 12, wherein the remote computer application is at least one of a smartphone application or website.

14. The multi-directional smart aquarium LED light bulb and system of claim 10, wherein the output characteristic is automatically adjustable based on at least one of time of day, lunar cycle, and season.

* * * * *